(12) United States Patent
Matsumura et al.

(10) Patent No.: US 12,125,612 B2
(45) Date of Patent: Oct. 22, 2024

(54) WIRE HARNESS FOR POWER STORAGE MODULE, AND METHOD OF PRODUCING WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

(72) Inventors: Nobuyuki Matsumura, Mie (JP); Hiroki Shimoda, Mie (JP); Isamu Hamamoto, Mie (JP); Yutaroh Gotoh, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 204 days.

(21) Appl. No.: 17/783,489

(22) PCT Filed: Dec. 8, 2020

(86) PCT No.: PCT/JP2020/045608
§ 371 (c)(1),
(2) Date: Jun. 8, 2022

(87) PCT Pub. No.: WO2021/131665
PCT Pub. Date: Jul. 1, 2021

(65) Prior Publication Data
US 2023/0011924 A1    Jan. 12, 2023

(30) Foreign Application Priority Data

Dec. 26, 2019  (JP) ................................. 2019-235828

(51) Int. Cl.
*H01B 7/00* (2006.01)
*H01M 50/543* (2021.01)
*H01R 4/02* (2006.01)

(52) U.S. Cl.
CPC ........ *H01B 7/0045* (2013.01); *H01M 50/543* (2021.01); *H01R 4/023* (2013.01)

(58) Field of Classification Search
None
See application file for complete search history.

(56) References Cited

U.S. PATENT DOCUMENTS 3,271,214 A * 9/1966 Tabor ..................... H05K 3/281
                                                       174/117 FF
4,000,558 A * 1/1977 Cahill .................. H01B 7/0838
                                                             29/850

(Continued)

FOREIGN PATENT DOCUMENTS

BR    PI0710711 A2 *  8/2011
CN       1181642 A  *  5/1998  ......... H01R 13/5216

(Continued)

OTHER PUBLICATIONS

DE_112013005121_Original_Translation (Year: 2013).*

(Continued)

*Primary Examiner* — Timothy J. Dole
*Assistant Examiner* — Muhammed Azam
(74) *Attorney, Agent, or Firm* — GREENBLUM & BERNSTEIN, P.L.C.

(57) ABSTRACT

The wire harness includes a base film having flexibility, a cover film covering the base film and having flexibility, and electric wires disposed between the base film and the cover (Continued)

film. The electric wires include first end sections that extend outside the base film and the cover film and second end sections that extend outside from the base film and the cover film from an opposite side from the first end sections. The base film and the cover film include welding portions at which the base film and the cover film are joined with welding.

8 Claims, 11 Drawing Sheets

(56) References Cited

U.S. PATENT DOCUMENTS

| | | | | | |
|---|---|---|---|---|---|
| 4,963,699 | A | * | 10/1990 | Urushibata | H01R 12/778 439/867 |
| 6,099,364 | A | * | 8/2000 | Shinchi | H01R 4/027 439/877 |
| 9,722,338 | B2 | * | 8/2017 | Tominaga | H01R 4/021 |
| 10,084,211 | B2 | * | 9/2018 | Nomoto | H01M 50/249 |
| 11,740,475 | B2 | * | 8/2023 | Strongwater | G06F 3/011 345/8 |
| 2002/0170729 | A1 | * | 11/2002 | Murakami | H01B 9/028 174/394 |
| 2006/0251965 | A1 | * | 11/2006 | Nagayama | H01M 4/366 429/231.95 |
| 2007/0045002 | A1 | * | 3/2007 | Jenrich | H01R 11/16 174/520 |
| 2009/0277671 | A1 | * | 11/2009 | Hahn | H01R 4/023 228/136 |
| 2010/0188826 | A1 | * | 7/2010 | Yeh | H05K 1/118 361/749 |
| 2015/0126078 | A1 | * | 5/2015 | Kawamura | H01R 43/02 439/874 |
| 2016/0036151 | A1 | * | 2/2016 | Tominaga | H01R 43/16 29/874 |
| 2018/0056896 | A1 | * | 3/2018 | Okamoto | B60R 16/0215 |
| 2018/0075943 | A1 | * | 3/2018 | Okamoto | H01G 11/08 |
| 2018/0108453 | A1 | * | 4/2018 | Schubert | H01M 50/204 |
| 2018/0138485 | A1 | * | 5/2018 | Nakayama | H01R 31/02 |
| 2018/0301832 | A1 | * | 10/2018 | Coakley | H01R 12/69 |
| 2019/0033387 | A1 | | 1/2019 | Ito et al. | |
| 2019/0392963 | A1 | * | 12/2019 | Ishida | H01B 7/0045 |
| 2020/0203036 | A1 | * | 6/2020 | Mizuno | H02G 3/30 |
| 2020/0203037 | A1 | * | 6/2020 | Yamaguchi | H02G 3/0456 |
| 2020/0203857 | A1 | * | 6/2020 | Scharkowski | H01R 43/0207 |
| 2020/0235503 | A1 | * | 7/2020 | Dressel | H01M 50/528 |
| 2021/0020331 | A1 | * | 1/2021 | Mizuno | B60R 16/0207 |

FOREIGN PATENT DOCUMENTS

| | | | | | |
|---|---|---|---|---|---|
| CN | 101448375 | B | * | 1/2011 | H01B 7/06 |
| CN | 106030729 | A | * | 10/2016 | H01R 12/598 |
| CN | 106030911 | A | * | 10/2016 | B23K 1/0016 |
| CN | 107430905 | | | 12/2017 | |
| CN | 208078080 | U | * | 11/2018 | |
| DE | 4439645 | C1 | * | 4/1996 | H01R 4/023 |
| DE | 19628850 | B4 | * | 8/2007 | B60R 16/0207 |
| EP | 2798700 | B1 | * | 5/2018 | H01B 11/1033 |
| FR | 2424646 | A1 | * | 11/1979 | |
| GB | 2135632 | A | * | 9/1984 | B29C 61/0633 |
| JP | H05182527 | | * | 7/1993 | |
| JP | H05290651 | | * | 11/1993 | |
| JP | 2002-299000 | | | 10/2002 | |
| JP | 2010-003803 | | | 1/2010 | |
| JP | 2012113896 | A | * | 6/2012 | |
| JP | 2013-045508 | | | 3/2013 | |
| JP | 2014026760 | A | * | 2/2014 | B60R 16/0207 |
| JP | 2014116285 | A | * | 6/2014 | H01B 13/01254 |
| JP | 2014143774 | A | * | 8/2014 | |
| JP | 2015118731 | A | * | 6/2015 | |
| JP | 2016-192320 | | | 11/2016 | |
| JP | 2017022139 | A | * | 1/2017 | H01M 10/4207 |
| JP | 2019-029173 | | | 2/2019 | |
| KR | 101726770 | B1 | * | 4/2017 | |
| PT | 91812 | A | * | 3/1990 | H01B 13/01254 |
| TW | 202141540 | A | * | 11/2011 | H01B 7/0838 |
| WO | WO-9220489 | A1 | * | 11/1992 | H02G 3/00 |
| WO | WO-9934373 | A1 | * | 7/1999 | H01B 7/0045 |
| WO | WO-2012023249 | A1 | * | 2/2012 | B60K 1/00 |
| WO | WO-2017122532 | A1 | * | 7/2017 | D03D 15/02 |
| WO | WO-2021197423 | A1 | * | 10/2021 | B23K 11/002 |

OTHER PUBLICATIONS

International Search Report, International Pat. Appl. No. PCT/JP2020/045608, dated Feb. 2, 2021, English translation.
Official Examination Report, China Patent Office, in counterpart Chinese Patent Application No. 202080084655.5, issued on May 27, 2023 (with English translation).

* cited by examiner

WIRE HARNESS FOR POWER STORAGE MODULE, AND METHOD OF PRODUCING WIRE HARNESS

TECHNICAL FIELD

The present disclosure describes technology related to a wire harness and a power storage module.

BACKGROUND ART

Technology of detecting conditions of power storage elements that are to be installed in a vehicle such as an automobile has been known. A battery wiring module disclosed in Japanese Unexamined Patent Application Publication No. 2013-45508 (Patent Document 1) includes bus bars, a flexible printed circuit board, and a resin protector. The bus bars connect electrode terminals. The flexible printed circuit board includes electrically conductive lines for detecting a condition of a single cell battery. The resin protector holds the bus bars and the flexible printed circuit board. Two rows of through holes are formed in the flexible printed circuit board and the resin protector includes two rows of pins that are to be inserted through the through holes in the flexible printed circuit board.

PRIOR ART DOCUMENT

Patent Document

Patent Document 1: Japanese Unexamined Patent Application Publication No. 2013-45508

SUMMARY OF THE INVENTION

Problem to be Solved by the Invention

The bus bars and the flexible printed circuit board are held by the hard resin protector and this likely leads to increase in size.

The technology described herein was made in view of the above circumstances. An object is to suppress increase in size of a wire harness that is to be mounted on power storage elements.

Means for Solving the Problem

A wire harness described herein is a wire harness to be mounted on power storage elements and includes a base film having flexibility, a cover film covering the base film and having flexibility, and electric wires disposed between the base film and the cover film. The electric wires include first end sections that extend outside the base film and the cover film and second end sections that extend outside the base film and the cover film from an opposite side from the first end sections. The base film and the cover film include welding portions at which the base film and the cover film are joined with welding.

A method of producing a wire harness described herein is a method of producing a wire harness to be mounted on power storage elements and includes disposing a base film having flexibility on a work table, disposing electric wires on the base film and covering the base film and the electric wires with a cover film having flexibility with first end sections of the electric wires extending outward and second end sections of the electric wires extending outward from an opposite side from the first end sections, and joining the base film and the cover film with welding.

Effects of Invention

According to the technology described herein, a wire harness is less likely to be increased in size.

MODES FOR CARRYING OUT THE INVENTION

[Description of Embodiments according to the Present Disclosure]

First, embodiments according to the present disclosure will be listed and described.

(1) A wire harness according to the present disclosure is a wire harness to be mounted on power storage elements and includes a base film having flexibility, a cover film covering the base film and having flexibility, and electric wires disposed between the base film and the cover film. The electric wires include first end sections that extend outside the base film and the cover film and second end sections that extend outside the base film and the cover film from an opposite side from the first end sections. The base film and the cover film include welding portions at which the base film and the cover film are joined with welding.

According to the above configuration, the wire harness is less likely to be increased in size compared to a configuration including a hard resin protector for covering the electric wires.

A method of producing a wire harness is a method of producing a wire harness to be mounted on power storage elements and includes disposing a base film having flexibility on a work table, disposing electric wires on the base film and covering the base film and the electric wires with a cover film having flexibility with first end sections of the electric wires extending outward and second end sections of the electric wires extending outward from an opposite side from the first end sections, and joining the base film and the cover film with welding.

According to the above configuration, the wire harness is less likely to be increased in size compared to a configuration including a hard resin protector for covering the electric wires.

(2) Terminals that can be electrically connected to electrode terminals of the power storage elements are included at the first end sections.

(3) The wire harness further includes bus bars being able to connect adjacent electrode terminals of the power storage elements and including the terminals.

(4) Temperature sensors for detecting temperature are included at the second end sections.

(5) The wire harness further includes a bent portion that is bent to integrally connect the base film and the cover film.

Accordingly, the base film and the cover film are formed by bending one single film.

(6) The bent portion includes through holes through which the first end sections or the second end sections are inserted.

Accordingly, the first end sections or the second end sections can extend outside through the through holes.

(7) At least one of the base film or the cover film includes through holes.

Accordingly, the through holes can be used for positioning at least one of the base film or the cover film in producing a wire harness.

(8) A power storage module includes the power storage elements and the wire harness that is mounted on the power storage elements.

(9) In the disposing of the base film on the work table, fitting through holes formed in the base film to positioning pins protruding from the work table to position the base film relative to the work table.

[Details of Embodiment according to the Present Disclosure]

Embodiments according to the present disclosure will be described with reference to the drawings. The present disclosure is not limited to the embodiments. All modifications within and equivalent to the technical scope of the claimed invention may be included in the technical scope of the present invention.

Embodiment 1

Embodiment 1 will be described with reference to FIGS. 1 to 6.

A power storage module 10 according to this embodiment is installed on a power supply route in a vehicle such as an automobile. The power storage module 10 (and a wire harness 20) may be installed with any orientation. In the following description, it is considered that an X arrow and a Y arrow point the front side and the left side, respectively.

(Power Storage Module 10)

Figure 1:
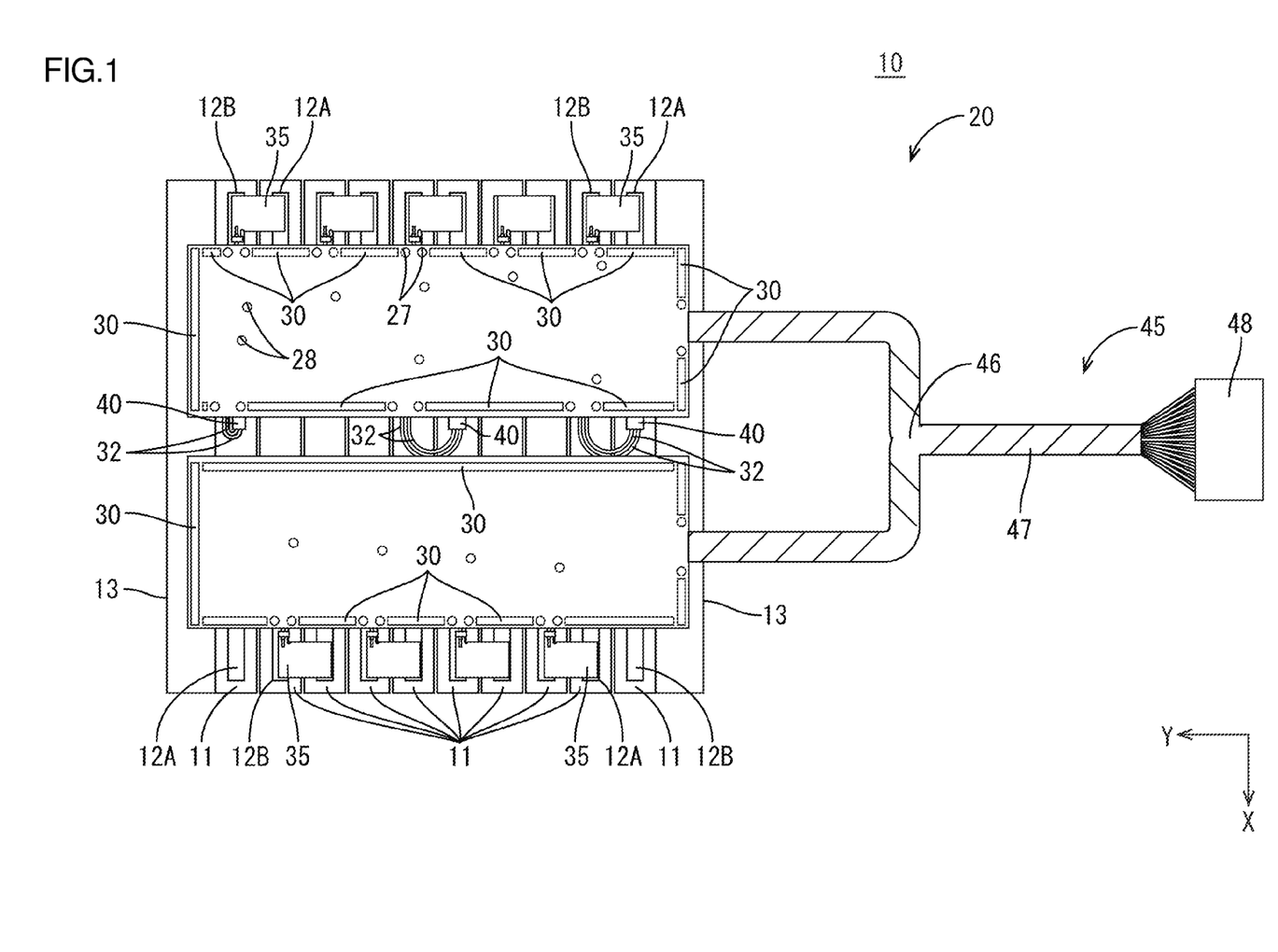
FIG. 1 is a plan view illustrating a power storage module according to Embodiment 1.

As illustrated in FIG. 1, the power storage module 10 includes power storage elements 11 that are arranged in a line and a wire harness 20 that is mounted on upper surfaces of the power storage elements 11. The power storage element 11 has a flat box shape. The power storage element 11 includes a power storage mechanism, which is not illustrated, therein. Each of the power storage elements 11 includes electrode terminals 12A, 12B having a positive polarity and a negative polarity (a positive electrode terminal 12A, a negative electrode terminal 12B in FIG. 1) on an upper surface of the power storage element 11. The power storage elements 11 are arranged such that the polarities of the adjacent electrode terminals 12A, 12B are opposite. The power storage elements 11 are sandwiched between two holding plates 13 that are fixed to a vehicle.

(Wire Harness 20)

Figure 2:
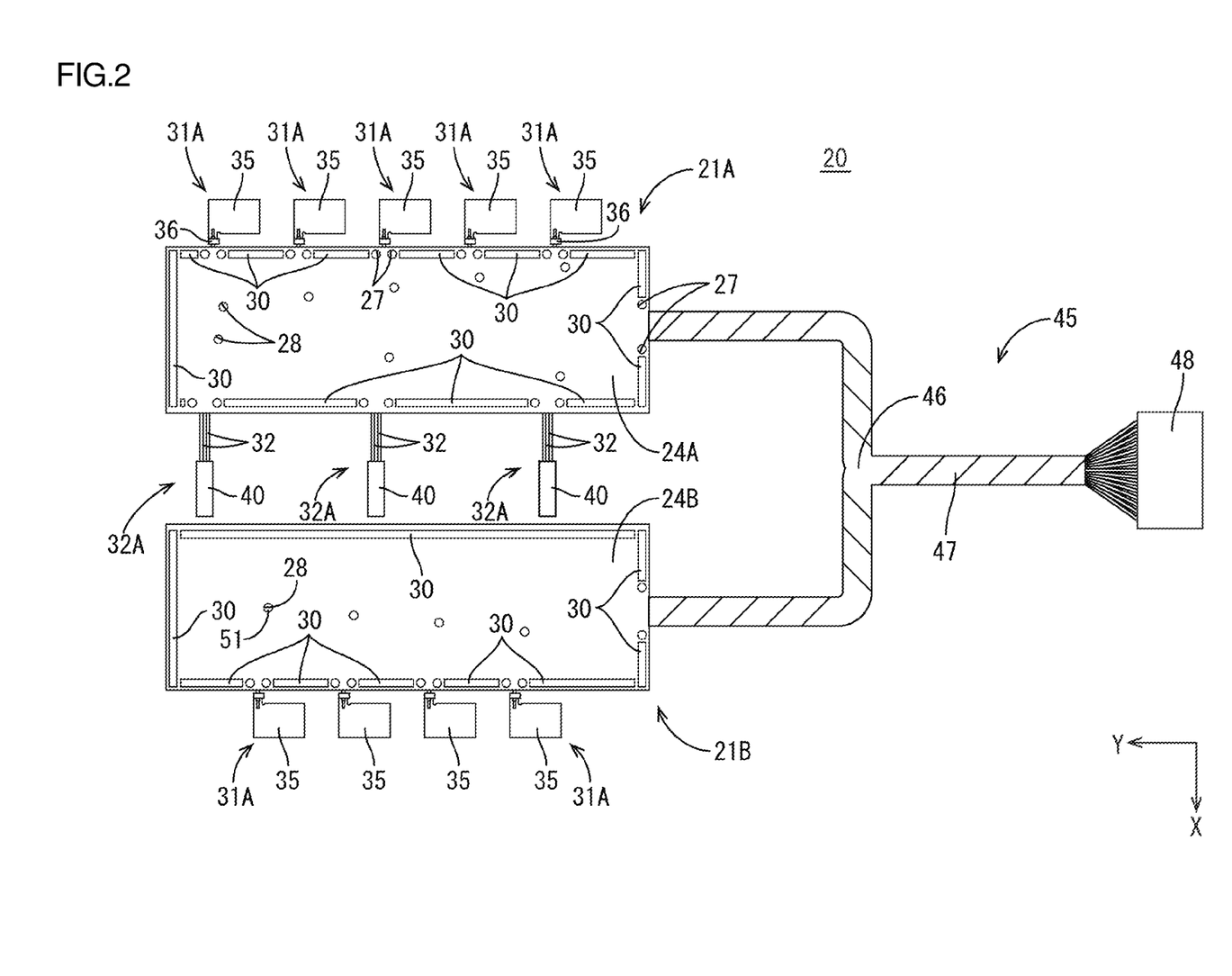
FIG. 2 is a plan view illustrating a wire harness.

As illustrated in FIG. 2, the wire harness 20 includes harness film sections 21A, 21B (two harness film sections in this embodiment) and a harness bundle section 45. The harness film sections 21A, 21B are mounted on the upper surfaces of the power storage elements 11. The harness bundle section 45 extends from the harness film sections 21A, 21B.

The harness film sections 21A, 21B include a first harness film section 21A and a second harness film section 21B. The first harness film section 21A includes a base film 23A (refer to FIG. 4), a cover film 24A (refer to FIG. 5) that covers the base film 23A, and electric wires 31, 32 (refer to FIG. 4) that are disposed between the base film 23A and the cover film 24A. The second harness film section 21B includes a base film 23B (refer to FIG. 4), a cover film 24B (refer to FIG. 5) that covers the base film 23B, and first electric wires (refer to FIG. 4) that are disposed between the base film 23B and the cover film 24B.

The base films 23A, 23B and the cover films 24A, 24B are thin rectangular sheets (a thickness of 0.3 mm to 0.5 mm, for example) and are made of synthetic resin selected from any kinds of synthetic resin including thermoplastic resin, thermosetting resin such as epoxy resin, and liquid crystal polymer (LCP), as necessary. Examples of thermoplastic resin include polyvinyl chloride (PVC), polypropylene (PP), polyethylene (PE), polyethylene terephthalate (PET), polybutylene terephthalate (PBT), and polyimide (PI).

Figure 4:
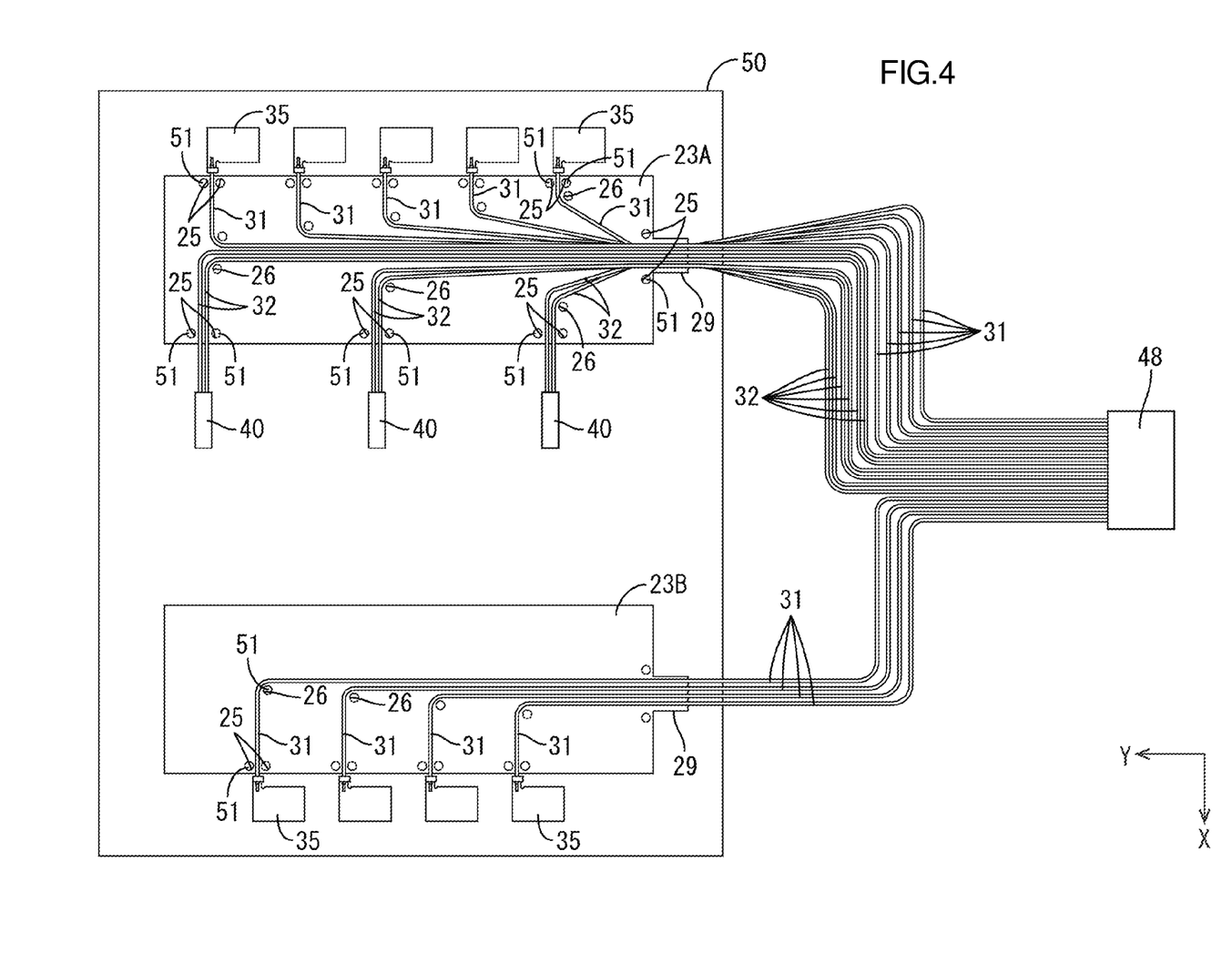
FIG. 4 is a plan view illustrating base films and the electric wires on a work table.
Figure 5:
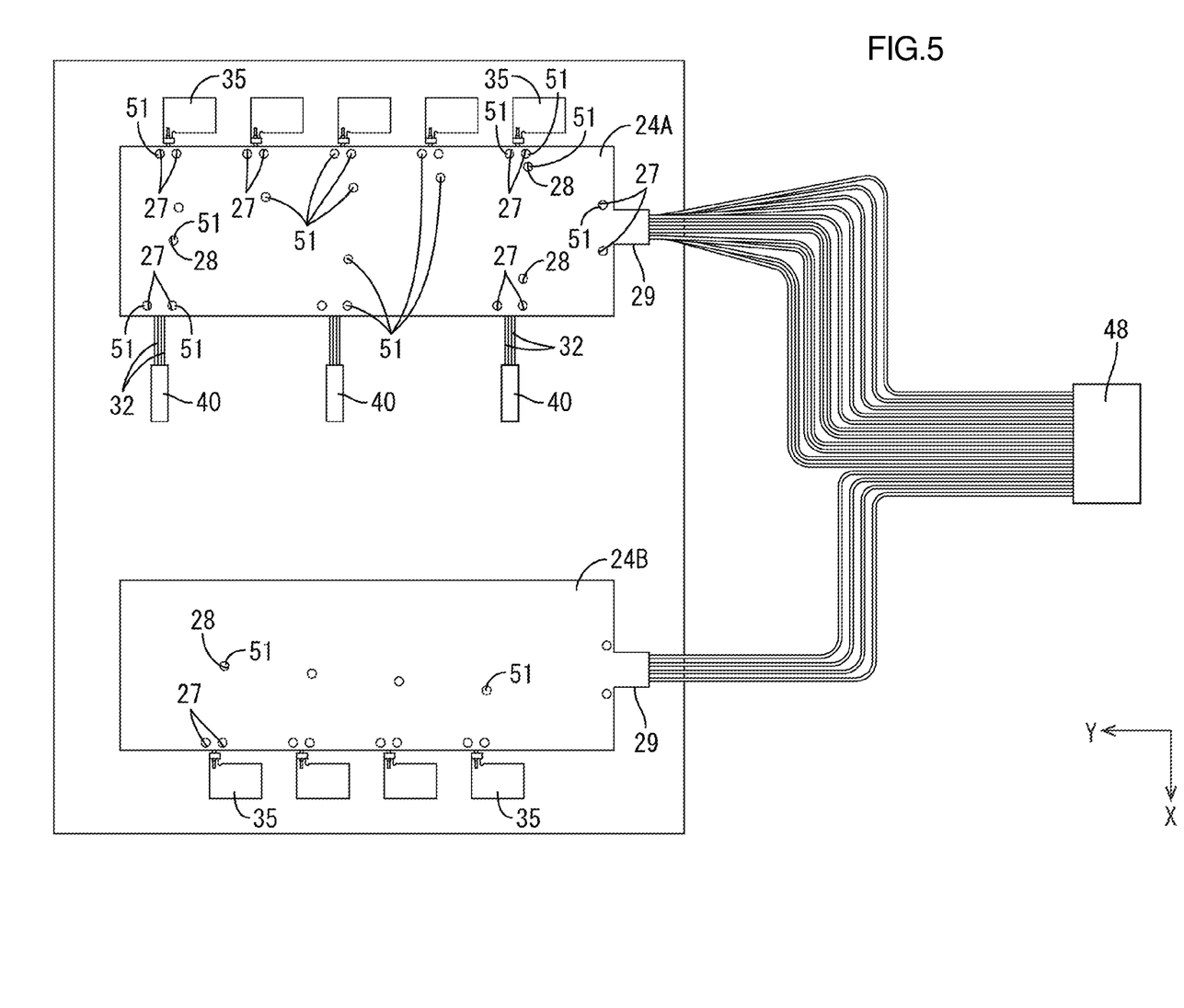
FIG. 5 is a plan view illustrating cover films that are disposed on the base films and the electric wires in FIG. 4.

As illustrated in FIGS. 4 and 5, the base films 23A, 23B and the cover films 24A, 24B include through holes 25 to that are circular through holes and through the films. Positioning pins 51 on a work table 50, which is used in producing, can be inserted through the through holes 25 to 28. The base films 23A, 23B are placed on the work table 50 in producing and the positioning pins 51 project from a flat upper surface of the work table 50 at positions corresponding to the through holes 25 to 28, respectively. With the positioning pins 51 being inserted through the respective through holes 25 to 28, the base films 23A, 23B and the cover films 24A, 24B can be positioned properly on the work table 50. The through holes 25 to 28 are arranged along wiring routes of the electric wires 31, 32. The base films 23A, 23B include a pair of through holes 25 in peripheral sections of the films and the cover films 24A, 24B include a pair of through holes 27 in peripheral sections of the films. Each pair of the through holes 25, 27 sandwiches the electric wires 31, 32. The through holes 26, 28 are in an inner section with respect to the peripheral sections of the base films 23A, 23B and the cover films 24A, 24B. The through holes 26, 28 are on an inner side of curved portions of the electric wires 31, 32. The through holes 25, 26 in the base films 23A, 23B and the through holes 27, 28 in the cover films 24A, 24B are substantially at the same positions, respectively (overlap with respect to an upper-bottom direction) when the cover films 24A, 24B are disposed on the base films 23A, 23B, respectively.

Figure 6:
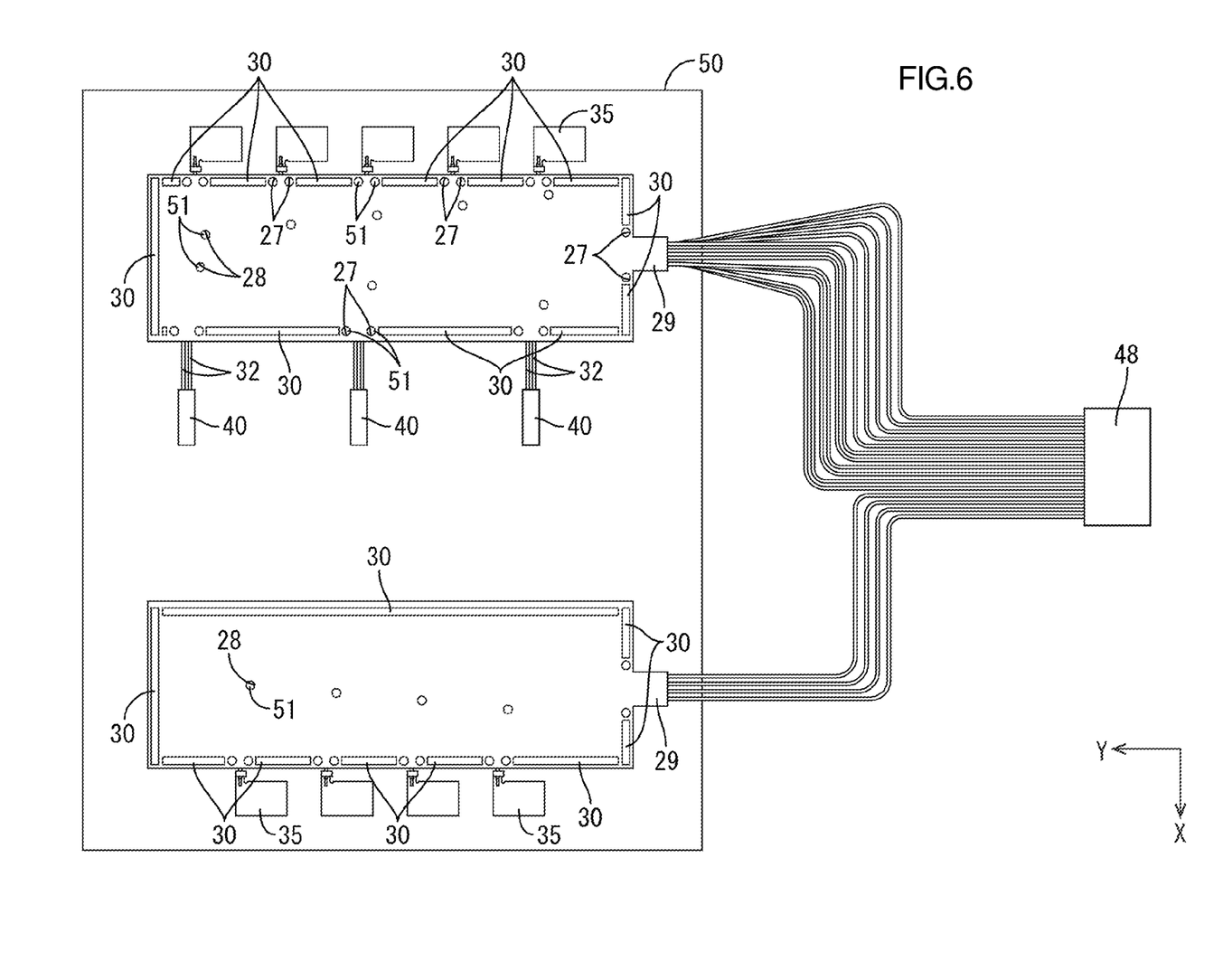
FIG. 6 is a plan view illustrating the base films and the cover films illustrated in FIG. 5 and are welded with heat.

As illustrated in FIG. 6, welding portions 30 are formed at the peripheral sections of the base films 23A, 23B and the peripheral sections of the cover films 24A, 24B and the base films 23A, 23B and the cover films 24A, 24B are joined at the welding portions 30. The welding portions 30 extend along the peripheries of the base films 23A, 23B and the cover films 24A, 24B. The welding portions 30 are formed on portions of the peripheral sections of the base films 23A, 23B and the cover films 24A, 24B and the portions of the peripheral sections are on an outer side with respect to a pair of the through holes 25, 27. No electric wires 31, 32 are disposed on the portions that are on an outer side with respect to a pair of the through holes 25. 27. No welding portion 30 is formed on a portion of the peripheral sections that is on an inner side with respect to the pair of the through holes 25, 27. The electric wires 31, 32 are disposed on the portion of the peripheral section that is on an inner side with respect to the pair of the through holes 25, 27.

As illustrated in FIGS. 5 and 6, at least one of the base film 23A, 23B or the cover film 24A, 24B (both of the base film 23A, 23B and the cover film 24A, 24B in this embodiment) includes an electric wire holding portion 29. The electric wire holding portions 29 project rightward from harness bundle section 45-side edges of the base films 23A, 23B and the cover films 24A, 24B. As illustrated in FIG. 2, the electric wire holding portion 29 is bound together with the electric wires 31, 32 with a binding member 47 such as a tape.

Figure 3:
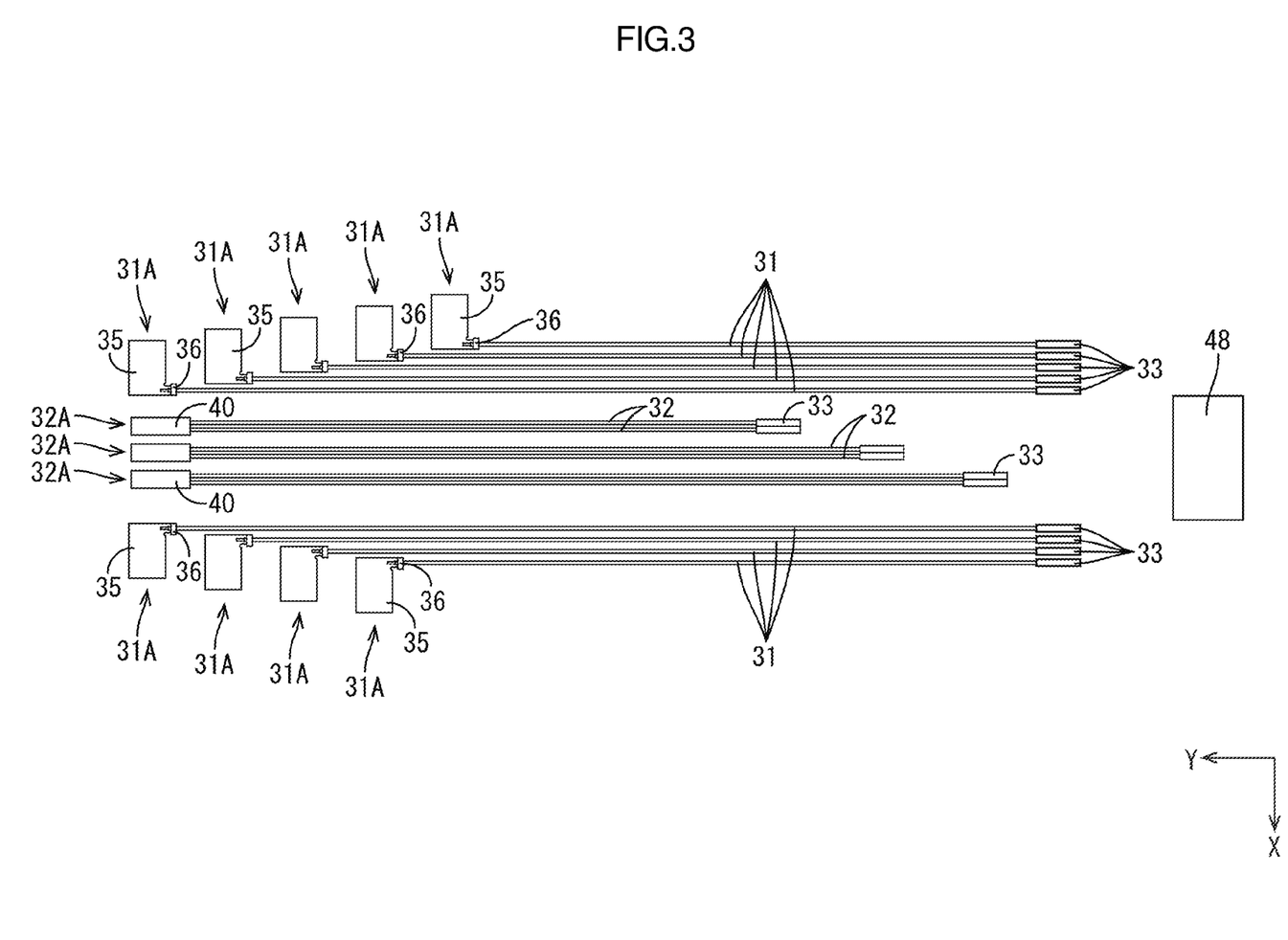
FIG. 3 is a plan view illustrating electric wires and a connector.

Each of the electric wires 31, 32 is a covered electric wire that includes a core wire and an insulating sheath that covers the core wire. The core wire is made of metal such as copper, copper alloy, aluminum, and aluminum alloy. As illustrated in FIG. 3, the electric wires 31, 32 included in the first harness film section 21A include the first electric wires 31 (five first electric wires 31 in this embodiment) that are connected to the bus bars 35 and second electric wires 32 (three second electric wires 32 in this embodiment) that are connected to temperature sensors 40. The second harness film section 21B includes the first electric wires 31 (four first electric wires 31 in this embodiment) that are connected to the bus bars 35 but does not include the second electric wires 32 connected to the temperature sensors 40.

As illustrated in FIGS. 2 and 3, the first electric wires 31 include first end sections 31A that extend outward from the base films 23A, 23B and the cover films 24A, 24B. The second electric wires 32 include second end sections 32A that extend outward from the base films 23A, 23B and the cover films 24A, 24B. The second end sections 32A extend from an opposite side from the first end sections 31A. The bus bars 35 are coupled to the respective first end sections 31A and the temperature sensors 40 are coupled to the respective second end sections 32A.

The bus bars 35 are rectangular metal plates made of copper, copper alloy, aluminum, and aluminum alloy. The bus bar 35 connects the electrode terminals 12A and 12B that are adjacent to each other. Terminals 36 are provided near the bus bars 35 and are connected to the core wires of the electric wires 31, 32 with crimping. The terminals 36 and the core wires may not be connected with crimping but may be connected with soldering or welding.

The temperature sensor 40 includes a temperature detection element that is held in an element holder and the temperature detection element may be a PTC thermistor or an NTC thermistor. The temperature sensor may not be a thermistor but may include other temperature detection element.

As illustrated in FIG. 2, the harness bundle section 45 is connected to a connector 48 and is branched at a branch section 46 to be connected to the harness film sections 21A, 21B. The connector 48 includes a housing made of synthetic resin. The housing receives and holds therein connector terminals 33 that are at ends of the electric wires 31, 32. The connector 48 is connected to a target connector that is connected to an external electric control unit (ECU) via the electric wires 31, 32. The ECU includes a microcomputer and elements and has a known configuration configured to detect a voltage, a current, and a temperature of each power storage element 11 and control charging and discharging of each power storage element 11.

A method of producing the wire harness 20 will be described.

As illustrated in FIG. 3, at two ends of the first electric wire 31, the insulating sheath is ripped to expose sections of the core wire and the terminal 36 of the bus bar 35 and the connector terminal 33 are connected to the exposed sections of the core wire, respectively, with crimping. At two ends of the second electric wire 32, the insulating sheath is ripped to expose sections of the core wire and the temperature sensor 40 and the connector terminal 33 are connected to the exposed sections of the core wire, respectively. Then, the connector terminals 33 are inserted in a cavity of the connector 48.

Next, as illustrated in FIG. 4, the base films 23A, 23B are placed on the work table 50 with inserting the positioning pins 51 of the work table 50 into the through holes 25, 26 that are through the base films 23A, 23B. Next, the electric wires 31, 32 are arranged on the base films 23A, 23B in a predefined route.

Next, as illustrated in FIG. 5, the cover films 24A, 24B are arranged on the respective base films 23A, 23B and the electric wires 31, 32 such that the positioning pins 51 are inserted in the through holes 27, 28 in the cover films 24A, 24B to position the cover films 24A, 24B.

Next, as illustrated in FIG. 6, the base films 23A, 23B and the cover films 24A, 24B are joined to each other with heat welding or ultrasonic welding at the peripheral sections of the base films 23A, 23B and the cover films 24A, 24B where no electric wires 31, 32 are disposed. With the electric wires 31, 32 being bound with the binding member 47 such as the tape, the wire harness 20 is obtained (FIG. 2).

Next, as illustrated in FIG. 1, the two harness film sections 21A, 21B of the wire harness 20 are arranged on the power storage elements 11 such that the bus bars 35 are disposed on the adjacent electrode terminals 12A, 12B and connected to the electrode terminals 12A, 12B with welding. The temperature sensors 40 are inserted in slots in a resin frame, which is disposed on the power storage elements 11 and not illustrated. Accordingly, the power storage module 10 is obtained.

According to this embodiment, operations and effects described below are obtained.

The wire harness 20 is to be mounted on the power storage elements 11 and includes the base film 23A having elasticity, the cover film 24A that covers the base film 23A and has flexibility, and the electric wires 31, 32 that are arranged between the base film 23A and the cover film 24A. The electric wires 31, 32 include the first end sections 31A that extend outward from the base films 23A, 23B and the cover films 24A, 24B and the second end sections 32A that extend outward from the base films 23A, 23B and the cover films 24A, 24B and extend from an opposite side from the first end sections 31A. The base film 23A and the cover film 24A include the welding portions 30 at which the base film 23A and the cover film 24A are joined to each other with welding.

According to this embodiment, the wire harness 20 is less likely to be increased in size compared to the configuration including a hard resin protector for covering the electric wires 31, 32.

At least one of the base film 23A or the cover film 24A includes the through holes 25 to 28.

According to such a configuration, the through holes 25 to 28 can be used for positioning at least one of the base film 23A or the cover film 24A when producing the wire harness 20.

Embodiment 2

Next, Embodiment 2 will be described with reference to FIGS. 7 to 11. A wire harness 60 (FIG. 7) of Embodiment 2 includes harness film sections 61A, 61B. The harness film section 61A, 61B includes one film 62, 65 that is folded to cover the electric wires 31, 32. In the following description, components having the same configuration as those of Embodiment 1 are indicated by the same reference signs as those in Embodiment 1 and will not be described.

Figure 7:
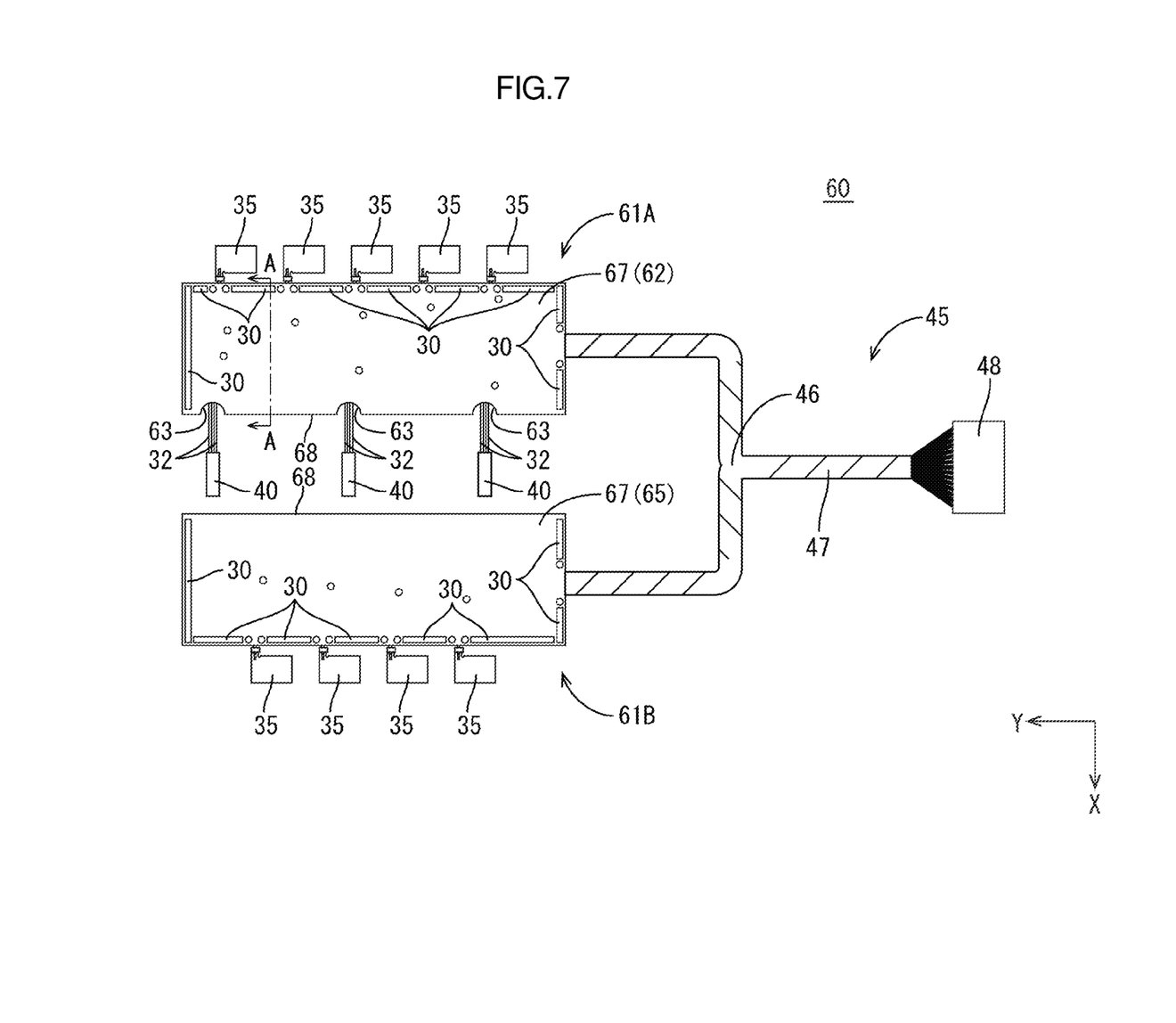
FIG. 7 is a plan view illustrating a wire harness according to Embodiment 2.
Figure 8:
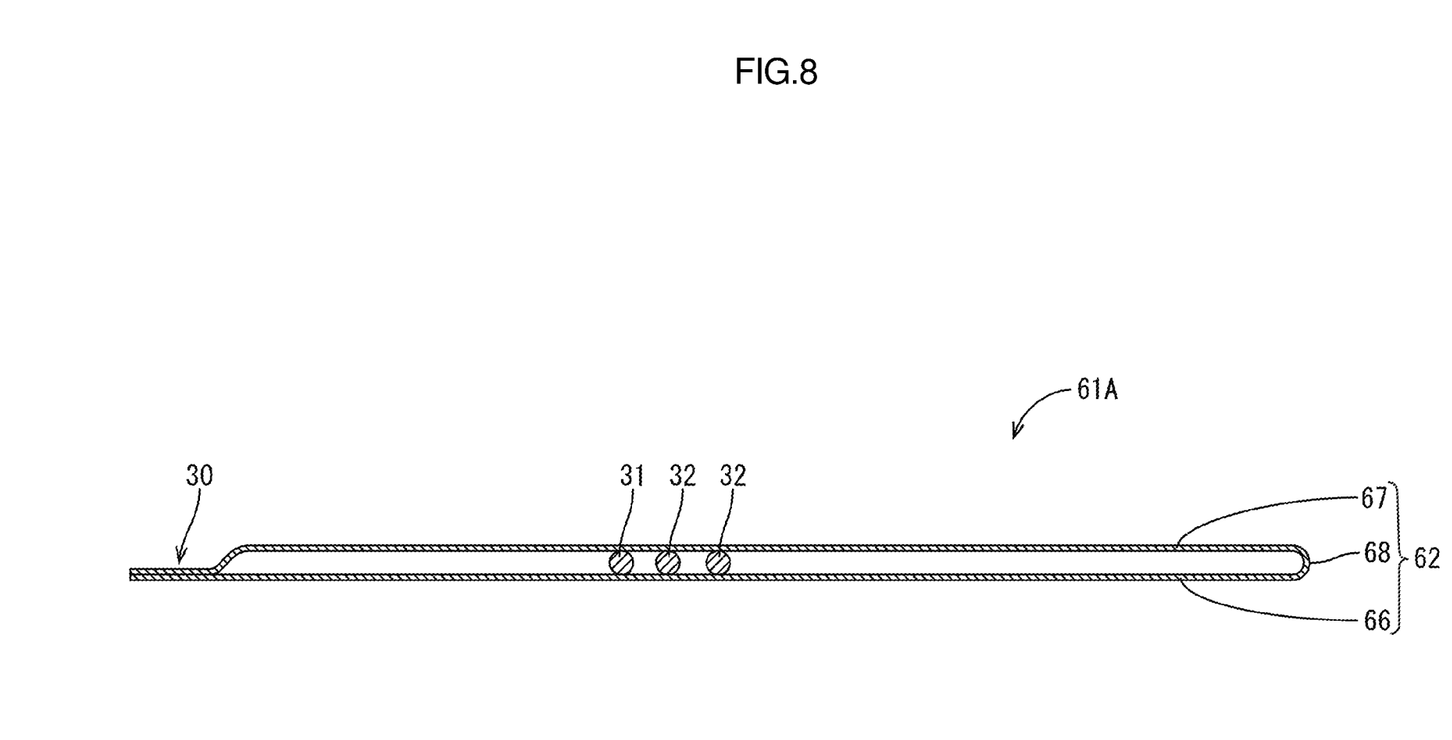
FIG. 8 is a cross-sectional view taken along A-A line in FIG. 7.
Figure 9:
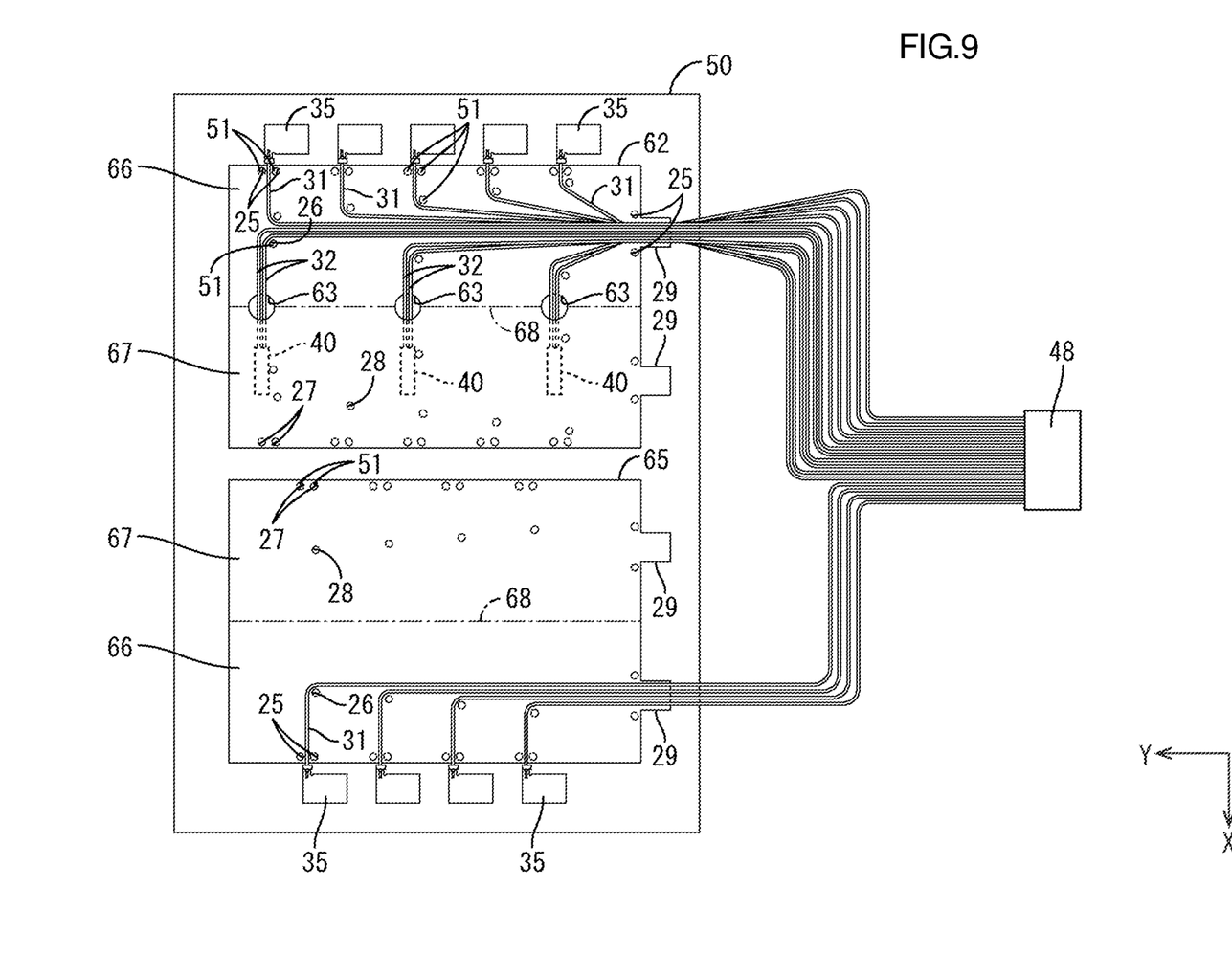
FIG. 9 is a plan view illustrating films and electric wires on a work table.

As illustrated in FIGS. 7 and 9, the harness film section 61A includes the electric wires 31, 32 and the film 62 that covers the electric wires 31, 32. The harness film section 61B includes the first electric wires 31 and the film 65 that covers the first electric wires 31. Each of the films 62, 65 includes a base film 66, a cover film 67 that covers the base film 66, and a bent portion 68 that integrally connects the base film 66 and the cover film 67. As illustrated in FIG. 8, the electric wires 31, 32 of the harness film section 61A are disposed between the base film 66 and the cover film 67. As illustrated in FIG. 7, through holes 63 are formed in the bent portion 68 of the film 62. The second electric wires 32 are inserted through the through holes 63. The through holes 63 are circular through holes and are arranged at intervals.

A method of producing the wire harness 60 will be described.

As illustrated in FIG. 9, the films 62, 65 that are in an open state are disposed at the predefined positions on the work table 50. Specifically, the through holes 25 to 28 in the base film 66 are fitted to the positioning pins 51 on the work table 50 to position the base film 66. With the second end sections 32A of the second electric wires 32 being inserted through the through holes 63 in the base film 66, the electric wires 31, 32 are arranged at the predefined positions on the base film 66 of the film 62.

Figure 10:
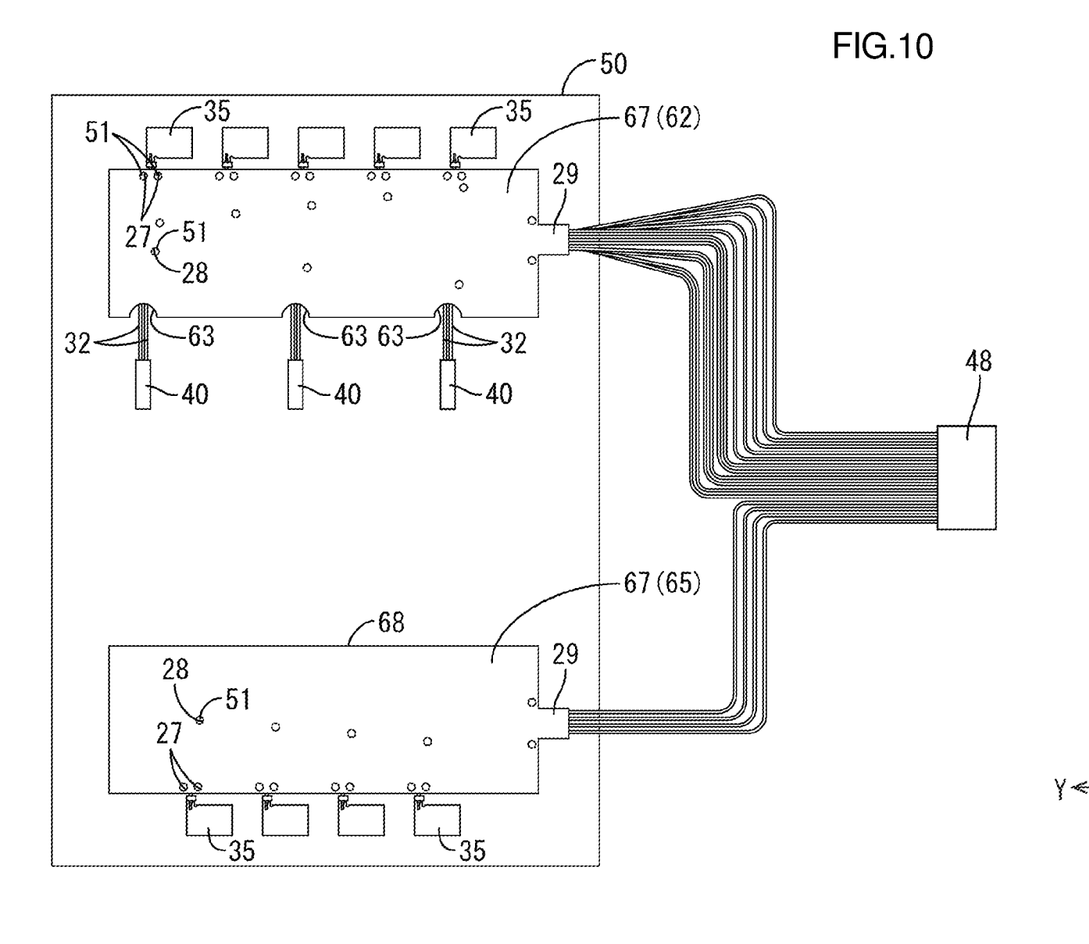
FIG. 10 is a plan view illustrating the films that are folded from the state illustrated in FIG. 9.

Next, as illustrated in FIG. 10, the films 62, 65 are folded to dispose the cover films 67 on the base films 66 and the electric wires 31, 32 and insert the positioning pins 51 through the through holes 27, 28 in the cover films 67 and position the cover films 67.

Figure 11:
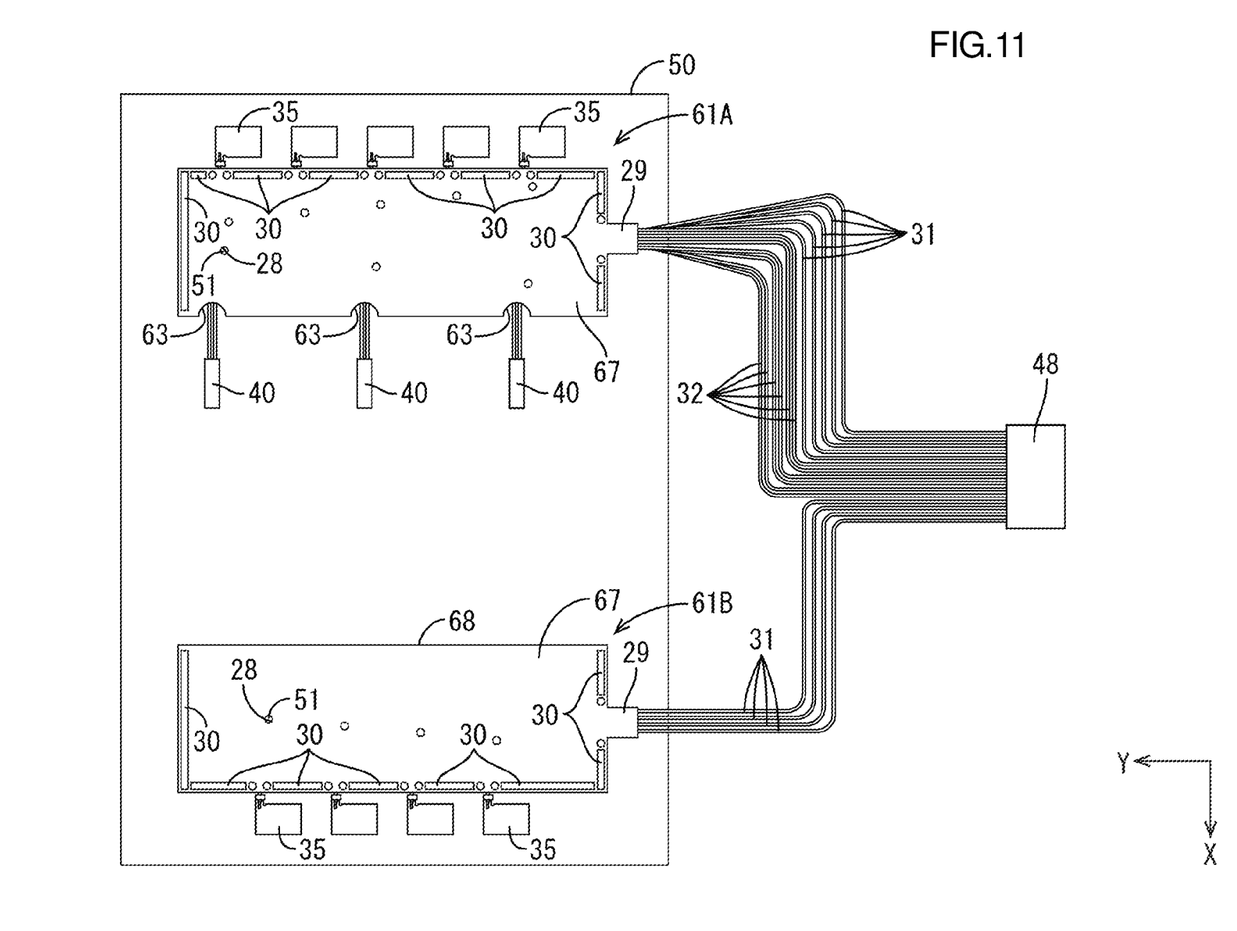
FIG. 11 is a plan view illustrating the base films and the cover films that are illustrated in FIG. 10 and welded with heat.

Next, as illustrated in FIG. 11, the base film 66 and the cover film 67 are joined with heat welding or ultrasonic welding at the peripheral sections of the base film 66 and the cover film 67 that overlap each other. Accordingly, the harness film sections 61A, 61B are formed. With the electric wires 31, 32 that are outside the harness film sections 61A, 61B being bound with the binding member 47 such as a tape, the wire harness 60 is obtained (FIG. 7).

According to Embodiment 2, operations and effects described below are obtained.

The bent portion 68 that is bent to integrally connect the base film 66 and the cover film 67 is included.

According to such a configuration, a single film 62 is bent to provide the base film 66 and the cover film 67.

The bent portion 68 includes the through holes 63 that are through the bent portion 68. The second end sections 32A (or the first end sections 31A) can be inserted through the through holes 63.

According to such a configuration, the second end sections 32A can extend outside through the through holes 63.

Other Embodiments

The technology disclosed herein is not limited to the embodiments described above and illustrated in the drawings. For example, the following embodiments will be included in the technical scope of the technology described in the present disclosure.

(1) The bus bars 35 and the temperature sensors 40 are entirely disposed outside the base films 23A, 23B, 66 and the cover films 24A, 24B, 67; however, portions of the bus bars 35 and the temperature sensors 40 may be disposed outside the base films 23A, 23B, 66 and the cover films 24A, 24B, 67 (portions of the bus bars 35 and the temperature sensors 40 may overlap the base films 23A, 22B, 66 and the cover films 24A, 24B, 67).

(2) The temperature sensors 40 are coupled to the respective second end sections 32A; however, the bus bars 35, voltage detection terminals, or other sensors (such as current sensors, pressure sensors) may be coupled to the respective second end sections 32A.

(3) The wire harness 20 (60) includes the second harness film section 21B (61B); however, a wire harness may not include the second harness film section 21B (61B) and include only the first harness section 21A (61A).

EXPLANATION OF SYMBOLS

10: Power storage module
11: Power storage element
12A, 12B: Electrode terminal
13: Holding plate
14: Output bus bar
20, 60: Wire harness
21A, 61A: First harness film section
21B, 61B: Second harness film section
23A, 23B, 66: Base film
24A, 24B, 67: Cover film
25 to 28: Through hole
29: Electric wire holding portion
30: Welding portion
31: First electric wire (electric wire)
32: Second electric wire (electric wire)
31A: First end section
32A: Second end section
33: Connector terminal
35: Bus bar
36: Terminal
40: Temperature sensor
45: Harness bundle section
46: Branch section
47: Binding member
48: Connector
50: Work table
51: Positioning pin
62: 65: Film
68: Bent portion
63: Through hole

The invention claimed is:

1. A wire harness to be mounted on power storage elements, the wire harness comprising:
   a first harness film section;
   a second harness film section;
   a harness bundle section binding electric wires that extend from the first harness film section and the second harness film section, the electric wires having one end sections that are connected to a connector and other end sections that are opposite from the one end sections, and the other end sections being divided into at least two groups and extend to the first harness film section and the second harness film section, respectively, wherein the first harness film section includes
a base film having flexibility and a cover film covering the base film and having flexibility,
the electric wires including first electric wires and second electric wires that are disposed between the base film and the cover film,
the other end sections of the first electric wires are defined as include-first end sections that extend outside the base film and the cover film and the other end sections of the second electric wires are defined as second end sections that extend outside the base film and the cover film from an opposite side from the first end sections, and
the base film and the cover film include welding portions at which the base film and the cover film are joined with welding.

2. The wire harness according to claim 1, further comprising terminals being included at the first end sections, wherein the terminals are configured to be electrically connected to electrode terminals of the power storage elements.

3. The wire harness according to claim 2, further comprising the terminals being included in bus bars that are configured to connect adjacent electrode terminals of the power storage elements.

4. The wire harness according to claim 1, wherein temperature sensors for detecting temperature are included at the second end sections.

5. The wire harness according to claim 1, further comprising a bent portion that is bent to integrally connect the base film and the cover film.

6. The wire harness according to claim 5, wherein the bent portion includes through holes through which the first end sections or the second end sections are inserted.

7. The wire harness according to claim 1, wherein at least one of the base film or the cover film includes through holes.

8. A power storage module comprising:
power storage elements; and
the wire harness according to claim 1 that is mounted on the power storage elements.

* * * * *

UNITED STATES PATENT AND TRADEMARK OFFICE
CERTIFICATE OF CORRECTION

PATENT NO. : 12,125,612 B2
APPLICATION NO. : 17/783489
DATED : October 22, 2024
INVENTOR(S) : Matsumura et al.

Page 1 of 1

It is certified that error appears in the above-identified patent and that said Letters Patent is hereby corrected as shown below:

In the Claims

Column 9, Line 8 (Claim 1, Line 21) please change "as include-first" to -- as first --.

Signed and Sealed this
Fifteenth Day of April, 2025

Coke Morgan Stewart
*Acting Director of the United States Patent and Trademark Office*